United States Patent
He et al.

(10) Patent No.: US 8,085,727 B2
(45) Date of Patent: Dec. 27, 2011

(54) METHOD AND APPARATUS TO FACILITATE THE CLOSURE OF MOBILITY TUNNELS

(75) Inventors: Haixiang He, Woburn, MA (US); Darwin A. Engwer, Pleasanton, CA (US)

(73) Assignee: Avaya Inc., Basking Ridge, NJ (US)

( * ) Notice: Subject to any disclaimer, the term of this patent is extended or adjusted under 35 U.S.C. 154(b) by 1024 days.

(21) Appl. No.: 11/021,379

(22) Filed: Dec. 23, 2004

(65) Prior Publication Data

US 2006/0140163 A1 Jun. 29, 2006

(51) Int. Cl.
*H04W 4/00* (2009.01)
(52) U.S. Cl. .......................................... 370/331; 455/436
(58) Field of Classification Search .......... 455/436–444; 370/331
See application file for complete search history.

(56) References Cited

U.S. PATENT DOCUMENTS

| 6,674,738 | B1 * | 1/2004 | Yildiz et al. .................. 370/338 |
| 2003/0158938 | A1 * | 8/2003 | Adatrao et al. ............... 709/225 |
| 2003/0224792 | A1 * | 12/2003 | Verma et al. .................. 455/436 |
| 2004/0028009 | A1 * | 2/2004 | Dorenbosch et al. ......... 370/329 |
| 2004/0103282 | A1 * | 5/2004 | Meier et al. .................. 713/171 |
| 2004/0106393 | A1 * | 6/2004 | Chowdhury et al. ......... 455/406 |

FOREIGN PATENT DOCUMENTS

KR   10-2001-0001928    *   1/2001

* cited by examiner

*Primary Examiner* — Steven Lim
(74) *Attorney, Agent, or Firm* — Chapin IP Law, LLC; David W. Rouille, Esq.

(57) ABSTRACT

According to one embodiment, a method involves receiving an incoming media access control (MAC) frame that includes a header, a frame body and an error detection field. Thereafter, an information element within the frame body is analyzed to determine whether to alter a mobility tunnel between a plurality of networking devices.

9 Claims, 5 Drawing Sheets

METHOD AND APPARATUS TO FACILITATE THE CLOSURE OF MOBILITY TUNNELS

FIELD

Embodiments of the present invention relate to the field of networking. In particular, one embodiment of the invention relates to a method and apparatus to assist in efficiently closing or altering mobility tunnels established between wireless devices deployed within a wireless network.

BACKGROUND

For many years, Internet Protocol (IP) technologies have supported packet-switched communications between computing devices through the use of packet forwarding devices such as routers and gateways. More specifically, blocks of information, generally referred to as "datagrams," are routed between computing devices, where source and destination computing devices are identified by fixed length addresses. Such routing is connectionless in nature, in that the datagrams are forwarded between the packet forwarding devices on a hop-by-hop basis using the destination address in the datagram.

Mobility is a very important feature in wireless local area network (WLAN) solutions. When a mobile wireless (computing) device moves from one point of attachment to another, its IP address may have to be changed, especially when the later point of attachment is on a different network. IP address changes can cause some disruptions to the on-going IP applications. To avoid such disruptions, many technologies have been developed. These solutions can be divided into three major categories.

The first category relies on a mobile wireless device somehow detecting that it is now located on a new IP subnet, and as a result, automatically releases and renews it's IP address (via Dynamic Host Configuration Protocol "DHCP"). As noted, this IP address change can be disruptive to on-going IP applications. Hence, automatic IP address renewal is an ineffective solution in many instances.

The second category is a client-based solution such as "Mobile IP." Mobile IP is an emerging "Layer 3" type protocol that allows a mobile wireless device to establish a wireless connection to an IP network. In general, Mobile IP is designed so that a mobile wireless device can acquire a new IP address, but still maintain its old IP address. This is accomplished through creation of mobility tunnels that will route datagrams from a prior (home) IP subnet to a new IP subnet and vice versa.

This tunneling is accomplished by implementing a Home Agent that maybe implemented on a router as part of the home IP subnet, which is responsible for maintaining current location information for the mobile wireless device and delivering datagrams to the mobile wireless device when roaming. When away from its home IP subnet, the router on the visitor IP subnet provides a "care-of address" for the mobile wireless device. A care-of address is a termination point of a mobility tunnel that enables information to be forwarded to the mobile wireless device while it is away from its home IP subnet.

In summary, this tunnel technology enables the routing of datagrams from the old IP subnet to the new IP subnet and vice versa. The main disadvantage of this approach is that it requires the implementation of Mobile IP within each mobile wireless device and ubiquitous support of Mobile IP in the infrastructure LAN devices.

The third category is an infrastructure or back-end based solution. In this solution, the mobile wireless device does not need to change its IP address. The back-end devices, such as access points "APs" and/or WLAN switches for example, will automatically tunnel traffic between the old attached network and the new attached network as well as related signaling processes. Since the IP address of the mobile wireless device does not change, the mobile wireless device maintains its point-of-presence in the network as being in the old IP subnet.

The problem is that the back-end infrastructure based solutions (like those described in the third category) requires extra resources on the back-end devices. Many implementations will try to close (or tear down) these back-end mobility tunnels when the back-end devices identify that these tunnels are not needed any more, namely the mobile wireless device has obtained a new IP address on the new IP subnet and no longer needs traffic to be tunneled to it from the old IP subnet. Without an acceptable housekeeping process, the number of open (and unused) tunnels increases and accumulates over time, consuming more and more network resources.

Previously, one solution for mobility tunnel closure involved timeouts due to lack of traffic. But, this is troublesome for devices with low duty cycle traffic patterns.

Another solution for mobility tunnel closure involved the back-end devices being adapted to sniff and detect client DHCP Discovery messages. When back-end devices, such as an AP or WLAN switch for example, detected the DHCP Discovery message sent from a mobile wireless device, those back-end devices assumed that the mobile wireless device did not need its old IP address. So, the back-end device closed any mobility tunnels that had been created for this mobile wireless device. This technique, however, is quite unreliable because there are certain situations where mobile wireless devices may send DHCP Discovery messages when it is still using the old IP address.

BRIEF DESCRIPTION OF THE DRAWINGS

The features and advantages of the present invention will become apparent from the following detailed description of the present invention in which.

DETAILED DESCRIPTION

Herein, exemplary embodiments of the invention relate to a method and apparatus for networking devices that implement back-end mobility tunnel technology to close or tear down mobility tunnels. These mobility tunnels were previously used to prevent Internet Protocol (IP) address changeover when a wireless device deployed within a wireless network transitioned from one IP subnet to another. One type of wireless network is a wireless local area network (WLAN) adapted to support communications using a wireless communication protocol. The wireless communication protocol is in accordance with a wireless communication standard, such as the IEEE 802.11 standard, HyperLAN, Bluetooth (IEEE 802.15) and other related standards. Herein, the term "IEEE 802.11 standard" represents the IEEE standard entitled "Part 11: Wireless LAN Medium Access Control (MAC) and Physical Layer (PHY) Specification," 1999 Edition, Reaffirmed Jun. 12, 2003, as well as any or all enhancement standards already ratified (e.g., IEEE 802.11a/b/g/d/h/i) and to be ratified in the future (e.g., IEEE 802.11n).

In the following description, certain terminology is used to describe features of the present invention. For example, a "networking device" is any network infrastructure equipment (e.g., an access point "AP", WLAN switch, etc.) that provides a bi-directional connection between one or more wireless devices and a link or wired network. A "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

A "wireless device" is defined herein as any electronic device comprising (1) logic for processing information (e.g., a processor, microcontroller, state machine, etc.) and (2) a wireless transceiver for receiving information from and/or transmitting information to an AP or another wireless device. Examples of wireless devices include, but are not limited or restricted to a computer (e.g., desktop computer, laptop computer, hand-held computer such as a personal digital assistant "PDA", etc.), communications equipment (e.g., pager, telephone, facsimile machine, etc.), entertainment equipment (e.g., portable audio players, video hand-held consoles, televisions, etc.), and the like.

In addition, the term "information" is defined as data, address, and/or control. For transmission, the information may be placed in a frame featuring a single packet or a series of packets, where each packet features a predetermined number of bits of information.

"Software" is executable code such as an operating system, an application, an applet or even a routine for example. The software may be stored in any appropriate storage medium such as a hard drive, semiconductor memory (non-volatile or volatile), or the like.

Figure 1:
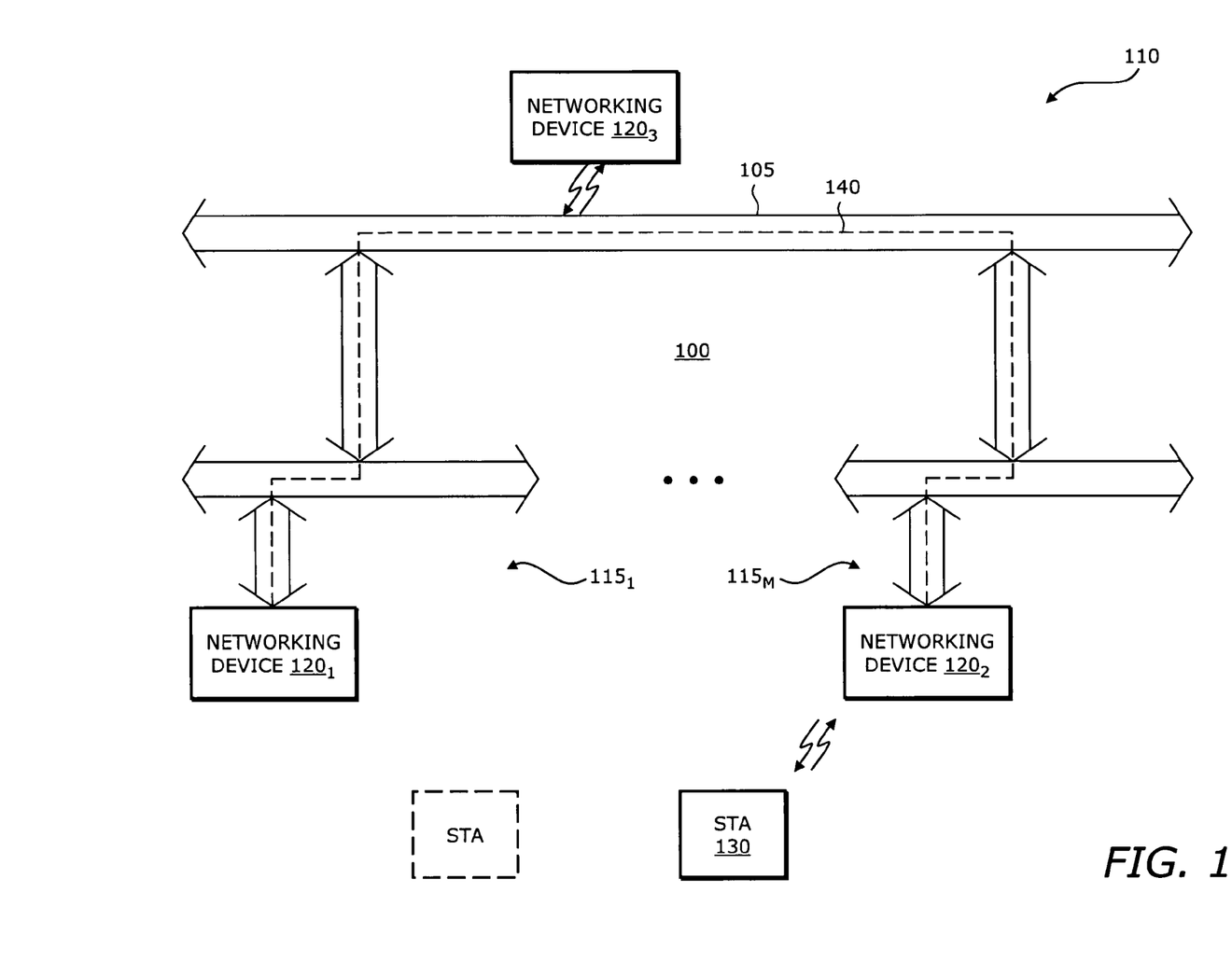
FIG. 1 is an exemplary embodiment of a wireless network featuring mobility tunnels established between two wireless devices.

Referring to FIG. 1, an exemplary embodiment of a wireless network 100 in accordance with the invention is illustrated. Wireless network 100 comprises a link 105 based on a physical medium. Herein, link 105 is part of a wired (backbone) network 110 that includes network resources available for users of wireless network 100. Wired network 110 may be separated into a plurality of subnets $115_1$-$115_M$ ($M \geq 1$).

Wireless network 100 further comprises a plurality of networking devices $120_1$-$120_3$ that communicate via a wireless link with one or more wireless devices (STA), including STA 130. STA 130 can access network resources (e.g., servers, printers, computers, etc.) in communication with wired network 110 via any of networking devices $120_1$-$120_3$, which are generally transparent bridges that connect a wireless network defined by STA 130 and any other STAs with the wired network 110 and its resources.

More specifically, networking devices $120_1$-$120_3$ each support a communication pathway between STA 130 and various resources on wired network 110. This communication pathway may be established through a wired connection back to wired network 110 as illustrated by networking device $120_1$ or through a wireless connection back to wired network 110 as illustrated by networking device $120_3$. Wired network 110 can be of any type, including an Ethernet, a token ring, or an asynchronous transfer mode (ATM) network.

Both networking devices $120_1$ and $120_2$ include mobility tunneling technology that enables a mobility tunnel 140 to be established between (IP) subnets $115_1$ and $115_2$. Therefore, as STA 130 roams from subnet 115 (old IP subnet) to subnet $115_2$ (new subnet), STA 130 can maintain its IP address associated with subnet $115_1$ instead of being required to change its IP address and disrupt on-going IP applications. Therefore, both networking devices $120_1$ and $120_2$ are used to provide information for IP applications operating on STA 130.

STA 130 communicates with networking device $120_2$ using a wireless communication protocol. For clarity sake, according to one embodiment of the invention, the wireless communication protocol is compliant with the IEEE 802.11 standard. It is contemplated, however, that the spirit and scope of the invention is applicable to other types of wireless communication protocols and wireless communication standards.

Figure 2:
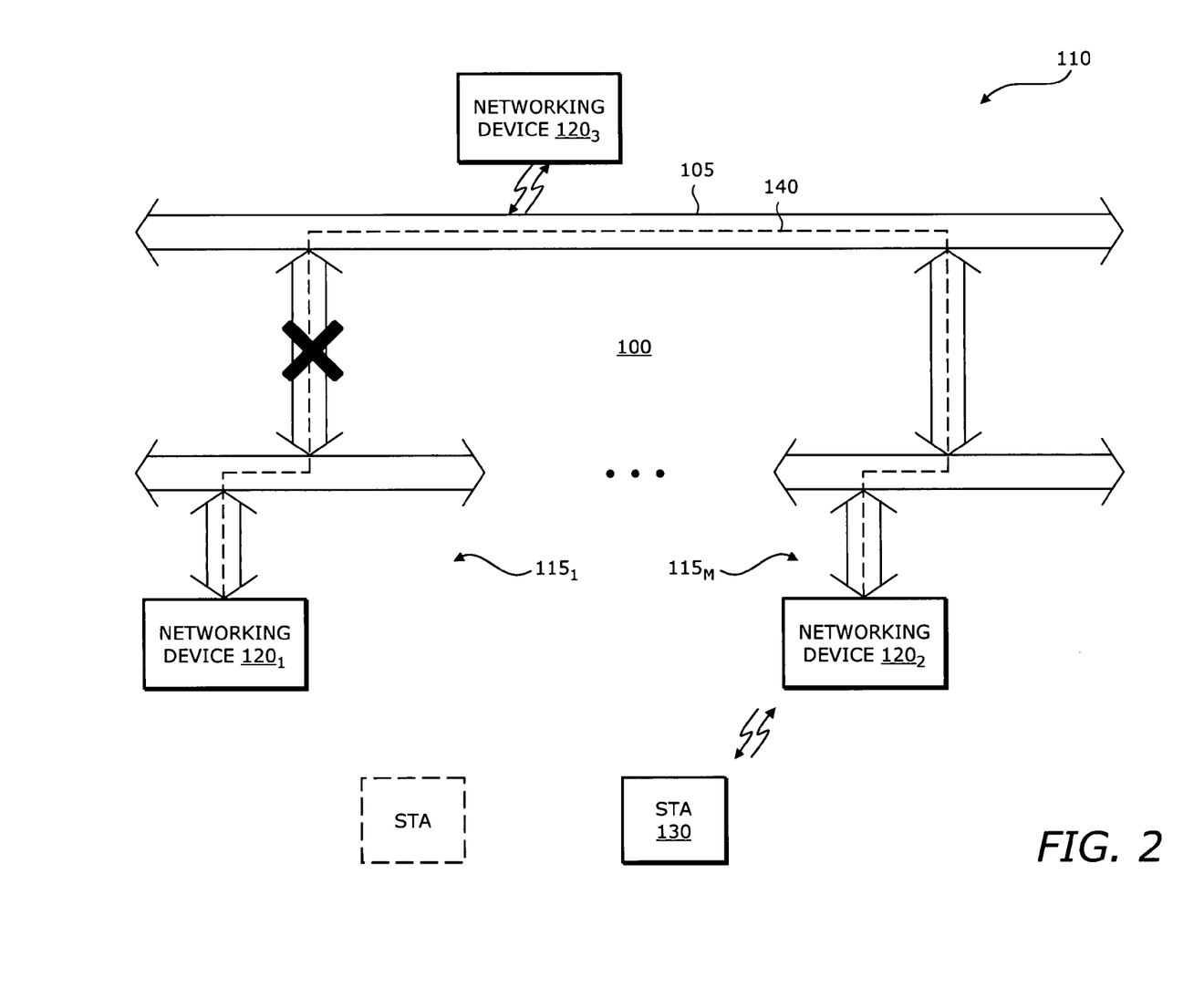
FIG. 2 is an exemplary embodiment of a wireless device (STA) of a wireless network requesting closure of the mobility tunnel in accordance with the invention.

Referring now to FIG. 2, an exemplary embodiment of STA 130 of wireless network 100 requesting closure of mobility tunnel 140 in accordance with the invention is shown. As shown, STA 130 is in communications with networking device $120_2$, which is part of subnet $115_2$. Upon receiving a particular Medium Access Control (MAC) frame from STA 130 and analyzing the contents thereof, networking device $120_2$ is able to determine that STA 130 has specifically requested closure of the existing mobility tunnel 140. In response, networking device $120_2$ closes (or tears down) mobility tunnel 140 as represented by "X".

Figure 3:
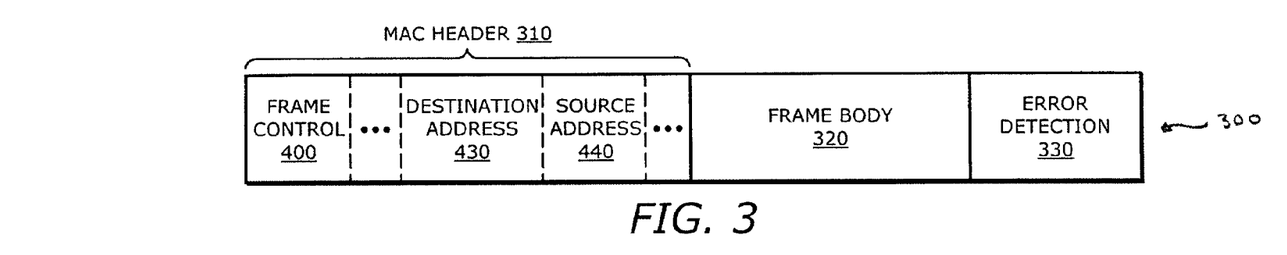
FIG. 3 is an exemplary embodiment of a Reassociation Request management frame transmitted from the wireless device.
Figure 4:
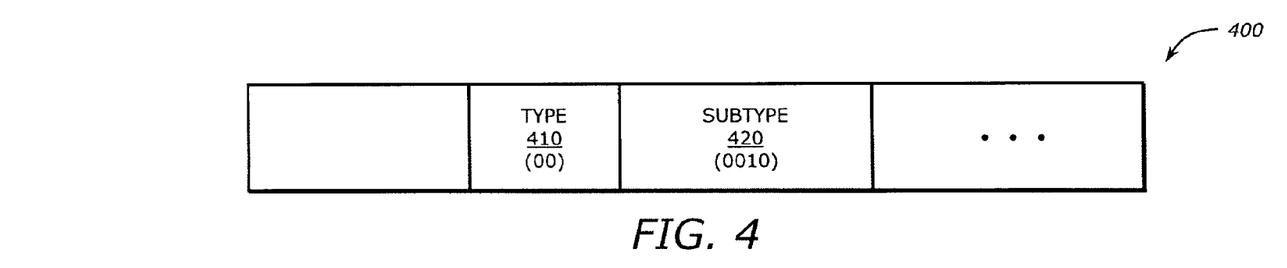
FIG. 4 is an exemplary embodiment of the Frame Control field of a MAC header for the Reassociation Request management frame of FIG. 3.
Figure 5:
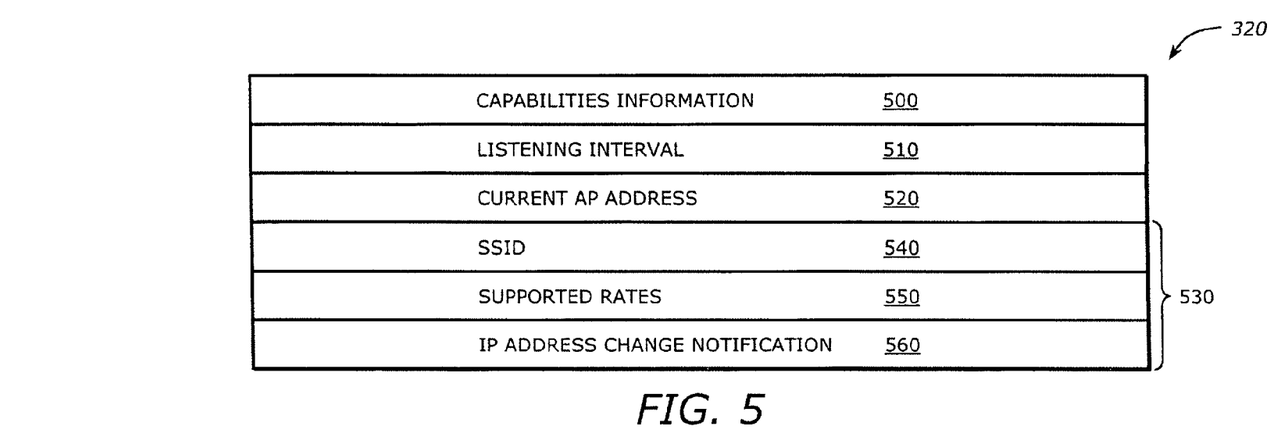
FIG. 5 is an exemplary embodiment of a frame body of the Reassociation Request management frame of FIG. 3 including an IP Address Change Notification information element.

According to one embodiment of the invention, a determination that STA 130 has requested closure of mobility tunnel 140 is accomplished by networking device $120_2$ receiving a specific MAC frame type such as a Reassociation Request management frame as shown in FIGS. 3-5. Although not shown, STA 130 is configured with a conceptual interface between its MAC layer and upper layers to allow an application to invoke attachment of and/or setting of information within an information element (IE) of the Reassociation Request management frame. This IE is adapted for specifically requesting closure of mobility tunnel 140.

The MAC address of STA 130 may be recovered from the initial Reassociation Request management frame, and used to determine the IP address of STA 130. Thereafter, networking device $120_2$ can access a stored list of IP addresses for "visiting" wireless devices for which mobility tunnels have been established with other networking devices. Further analysis of information within the second Reassociation Request management frame would identify that mobility tunnel 140 is requested to be closed (or torn down), prompting networking device $120_2$ to close the mobility tunnel 140.

According to another embodiment of the invention, a determination that STA 130 has requested closure of mobility tunnel 140 is accomplished by networking device $120_2$ conducting a check on a portion of a particular type of incoming MAC frame. If the portion of the incoming MAC frame indicates that a mobility tunnel is to be closed, networking device $120_2$ uses information within the MAC frame to determine that it originated from STA 130, and in response, closes mobility tunnel 140 associated with STA 130.

As described above, MAC frames are transmitted from STA 130 to networking device $120_2$ in order to communicate over wireless network 100. As shown in FIG. 3, each MAC frame 300 comprises a plurality of fields that occur in a fixed order. These fields include a MAC header 310, a frame body 320 and error detection 330.

As shown in FIG. 4, MAC header 310 comprises a frame control field 400 that identifies the type and general functionality of MAC frame 300. Frame Control field 400 includes, but is not limited or restricted to the following: a Type field 410 and a Subtype field 420.

Type and Subtype fields 410 and 420 identify the frame type of MAC frame 300. According to this embodiment, MAC frame 300 may be one of three different frame types: control, data and management. Each of these frame types has several defined subtypes. For instance, where the MAC frame transmitted by STA 130 of FIG. 2 to close mobility tunnel 140 is a Reassociation Request management frame, Type field 410 features "00" as its coded value while "0010" is the coded value for Subtype field 420.

Besides Frame Control field 400, MAC header 310 further comprises a Destination Address 430 and a Source Address 440. According to one embodiment of the invention, both Destination Address 430 and Source Address 440 would contain the MAC addresses associated with networking device $120_2$ and STA 130 of FIG. 2, respectively.

Referring now to FIG. 5, with respect to Reassociation Request management frames, frame body 320 includes, but is not limited or restricted to the following: a Capabilities Information field 500, a Listening Interval field 510, a Current AP address field 520, and a plurality of information elements 530 such as a Service Set Identity (SSID) 540, Supported Rates 550 and an IP Address Change Notification 560.

Capabilities Information field 500 contains a number of subfields that are used to provide requested or advertised capabilities of STA 130. For example, a Contention-Free (CF) Pollable subfield (not shown) may be used to identify that the STA supports operation in Point Coordination mode. Similarly, a CF-Poll Request subfield (not shown) may be used for implementing CSMA/CA so that the networking device polls each mobile device on the network incrementally, providing a Clear to Send window. This may be useful when transmitting audio or video streams because of the strict synchronization that is provided.

Listening Interval field 510 is used to indicate to the networking device how often STA 130 awakens to listen to Beacon management frames. The value of this parameter is the STA's Listening Interval parameter expressed in units of Beacon Intervals. According to one embodiment, the length of Listening Interval field 510 is two octets.

Current AP address field 520 is the MAC address of the networking device with which STA 130 is currently associated. According to one embodiment, the length of Current AP address field 520 is six octets.

Each of the plurality of information elements (IEs) 530 is structured to include an element identifier (ID), namely a code value to identify the particular IE, an Information field having information associated with the IE, and a Length field that specifies the number of octets in the Information field. The information associated with the IE has a variable length, depending on the particular IE.

SSID 540 indicates the identity of an ESS to which the AP is a member. Supported Rates IE 550 is a code value that specifies the data rates supported by the STA. This enables the STA to avoid associating with a Basic Service Set (BSS) if the STA does not support all of the basic data rates of the BSS.

Figure 6:
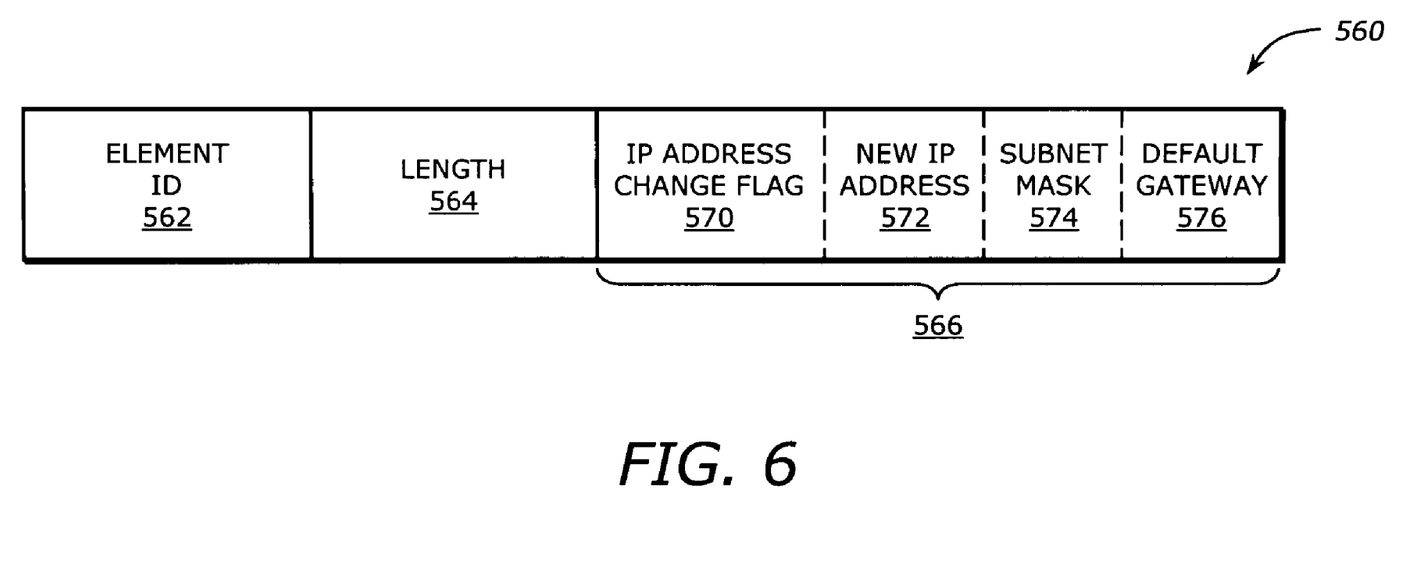
FIG. 6 is an exemplary embodiment of the IP Address Change Notification information element of FIG. 5.

As shown in FIG. 6, IP Address Change Notification 560 is an information element (IE) that comprises an Element ID 562, a Length field 564 and an Information field 566. Information field 566 comprises an IP Address Change flag 570 and optionally (i) new IP address of STA 572, (ii) subnet mask 574 and (iii) default gateway 576 as represented by dashed lines.

When set, IP Address Change flag 570 indicates that STA 130 does not need its old IP address. Upon receipt of the Reassociation Request frame and detection that IP Address Change flag 570 is set, networking device $120_2$ closes the mobility tunnel(s) associated with STA 130.

The purpose of the Reassociation Request management frame containing the IP Address Change Notification IE 560 is not to perform roaming to a new networking device, but to inform the current networking device of new information, namely the new IP address for STA 130.

It is noted that placement of IP Address Change Notification IE 560 into a Reassociation Request management frame is consistent with the general WLAN operations because Reassociation Request management frames can be used to update the STA's capabilities or parameters with the current networking device. For instance, a redundant Reassociation Request management frame can be used to adjust its supported rates or security profile.

Figure 7:
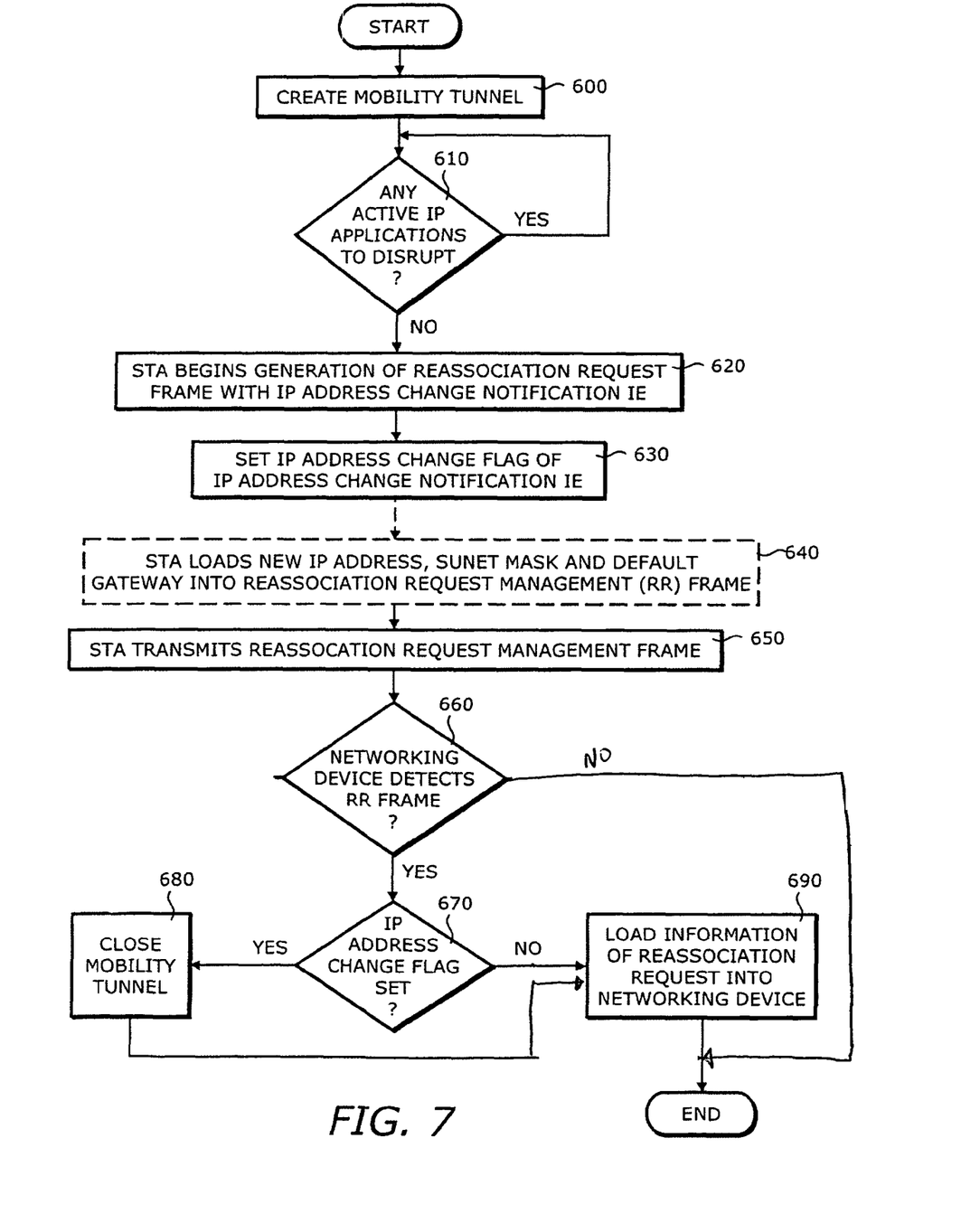
FIG. 7 is an exemplary embodiment of a flowchart illustrating communications between the wireless device and a networking device to close a mobility tunnel.

Referring now to FIG. 7, an exemplary embodiment of a flowchart illustrating signaling between STA 130 and networking device $120_2$ of FIG. 2 to initiate closure of mobility tunnel 140 is shown. Prior to such signaling, a mobility tunnel is created between a networking device currently associated with the wireless device and a networking device previously associated with the wireless device (block 600).

After receiving a new IP address caused by its association with a networking device on a different IP subnet and determining that no active IP applications would be disrupted (non-limiting), STA generates a Reassociation Request management frame (blocks 610 and 620). The Reassociation Request management frame comprises an additional information element, namely the IP Address Change Notification. The IP Address Change flag of the IP Address Change Notification IE is set to specifically request the current networking device to close the mobility tunnel (block 630). As an option, the STA may further provide the current networking device with its new IP address, a subnet mask and default gateway (block 640).

The Reassociation Request management frame is transmitted from the STA and received by the current networking device (block 650). Upon detecting that IP Address Change flag is set, the current networking device closes the mobility tunnel associated with STA 130 (blocks 660, 670 and 680). If the IP Address Change Flag is not set, the information within the Reassociation Request management frame is loaded into the networking device. Such information may alter security policies or provide updated information concerning the STA (block 690).

It is contemplated, however, that the new Reassociation Request management frame may be used for other operations in lieu of closing the mobility tunnel. For example, the IP Address Change Notification IE may be adapted to include a MAC address of another networking device in order to close the mobility tunnel, and open a new mobility tunnel between the current networking device and the networking device associated with the MAC address.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A non-transitory computer readable storage medium encoded with a frame adapted for transmission from a wireless device to a first networking device over a link with the first networking device in communication with a second networking device over a mobility tunnel, the frame comprising:
   a header; and
   a frame body including an information element to solely initiate closure of the mobility tunnel, said mobility tunnel established between a first and second Internet Protocol (IP) subnets so that as said wireless device roams from the first IP subnet to the second IP subnet said wireless device maintains its IP address associated with said first IP subnet, the information element of the frame body comprises an Internet Protocol (IP) Address flag set due to a non-active state of at least one IP application executed between said wireless device and said first networking device via the IP address associated with the first IP subnet, the set IP Address flag thereby causing the second networking device to close the mobility tunnel between the first networking device and the second networking device and establish a new IP address of the wireless device, and a subnet mask, wherein said mobility tunnel established between the respective first and second IP subnets allows the wireless device to maintain the IP address associated with said first IP subnet.

2. The frame of claim 1, wherein the frame header including a frame control field having a type field with a value of "00" and a subtype field with a value of "0010".

3. A method comprising:
   receiving a frame at a first networking device associated with a first Internet Protocol (IP) subnet, the frame being a Reassociation Request management frame in accordance with an IEEE 802.11 standard;
   analyzing an IP Address flag within the frame by determining whether the IP Address flag set due to a non-active state of at least one IP application executed between a wireless device and a second networking device via an IP address associated with a second IP subnet; and
   based on the set IP Address flag, initiating closure, by the first networking device, of a mobility tunnel established between the respective first and second IP subnets, wherein said mobility tunnel established between the first and second IP subnets allows the wireless device to maintain the IP address associated with said first IP subnet as the wireless device roams from the first IP subnet to the second IP subnet.

4. A method comprising:
   generating a Reassociation Request management frame by a wireless device;
   setting a flag of a predetermined information element within the frame;
   transmitting the Reassociation Request management frame by the wireless device to a first networking device associated with a first Internet Protocol (IP) subnet;
   receiving the frame by the first networking device;
   analyzing the flag of the predetermined information element within the frame, the flag of the predetermined information element of the frame body, wherein the flag is set due to a non-active state of at least one IP application executed between the wireless device and a second networking device via an IP address associated with a second IP subnet, wherein the predetermined information element comprises an IP Address flag to solely initiate closure of the mobility tunnel; and
   based on the set IP Address flag, closing a mobility tunnel between the first networking device and a second networking device, wherein said mobility tunnel is established between the respective first and second IP subnets so that as the wireless device roams from the second IP subnet to the first IP subnet said wireless device is able to maintain the IP address associated with said second IP subnet.

5. A method comprising:
   receiving an incoming media access control (MAC) frame, the MAC frame including a header, a frame body and an error detection field;
   analyzing whether data in an information element within the frame body is set due to a non-active state of at least one Internet Protocol (IP) application executed between a wireless device and a first networking device via an IP address associated with a first IP subnet, wherein presence of set data due to the non-active state of the at least one IP application causes initiation of closure of a mobility tunnel between at least the first networking device and a second networking device associated with a second IP subnet, said mobility tunnel established between the respective first and second IP subnets so that as the wireless device roams from the first IP subnet to the second IP subnet said wireless device is able to maintain the IP address associated with said first IP subnet, the information element of the frame body comprises an IP Address flag to solely initiate closure of the mobility tunnel; and
   altering the mobility tunnel between at least the first networking device and the second networking device based on the data within the predetermined information element, wherein the altering of the mobility tunnel between at least the first networking device and the second networking device includes closing of the mobility tunnel and opening a new mobility tunnel between the first networking device and the second networking device.

6. The method of claim 5, wherein the altering of the mobility tunnel between at least the first networking device and the second networking device further includes opening a new mobility tunnel between the first networking device and a third networking device.

7. The method of claim 5, wherein the analyzing of the information element includes determining whether an Internet Protocol (IP) Address Change flag within the information element has been set, the IP Address Change flag indicating that a wireless device transmitting the MAC address has no further need for an IP address maintained by the second networking device.

8. The method of claim 5, wherein the mobility tunnel is closed if the IP Address Change flag of the information element is set.

9. A method comprising:
   receiving an incoming media access control (MAC) frame at a first networking device associated with a first Internet Protocol (IP) subnet, the MAC frame being a Reassociation Request management frame in accordance with an IEEE 802.11 standard and including a header, a frame body and an error detection field;
   analyzing whether an information element within the frame body is set due to a non-active state of at least one IP application executed between a wireless device and a second networking device via an IP address associated with a second IP subnet, wherein the set data due to the non-active state of the at least one IP application further causes initiation of closure of a mobility tunnel between at least the respective first and second networking devices, wherein said mobility tunnel is established between the first and second Internet Protocol (IP) subnets to allow the wireless device to maintain the IP address associated with said second IP subnet as the wireless device roams from the second IP subnet to the first IP subnet; wherein the information element of the frame body comprises an IP Address flag to solely initiate closure of the mobility tunnel; and altering the mobility tunnel between at least a first networking device and a second networking device based on the data within the predetermined information element, the altering of the mobility tunnel between at least the first networking device and the second networking device includes closing of the mobility tunnel.

* * * * *